Dec. 17, 1968    L. C. McGAHAN    3,416,362
SYSTEM FOR MEASURING MOMENTS OF INERTIA
Filed Sept. 22, 1966    2 Sheets-Sheet 1

INVENTOR.
LEROY C. MCGAHAN
BY
ATTORNEYS

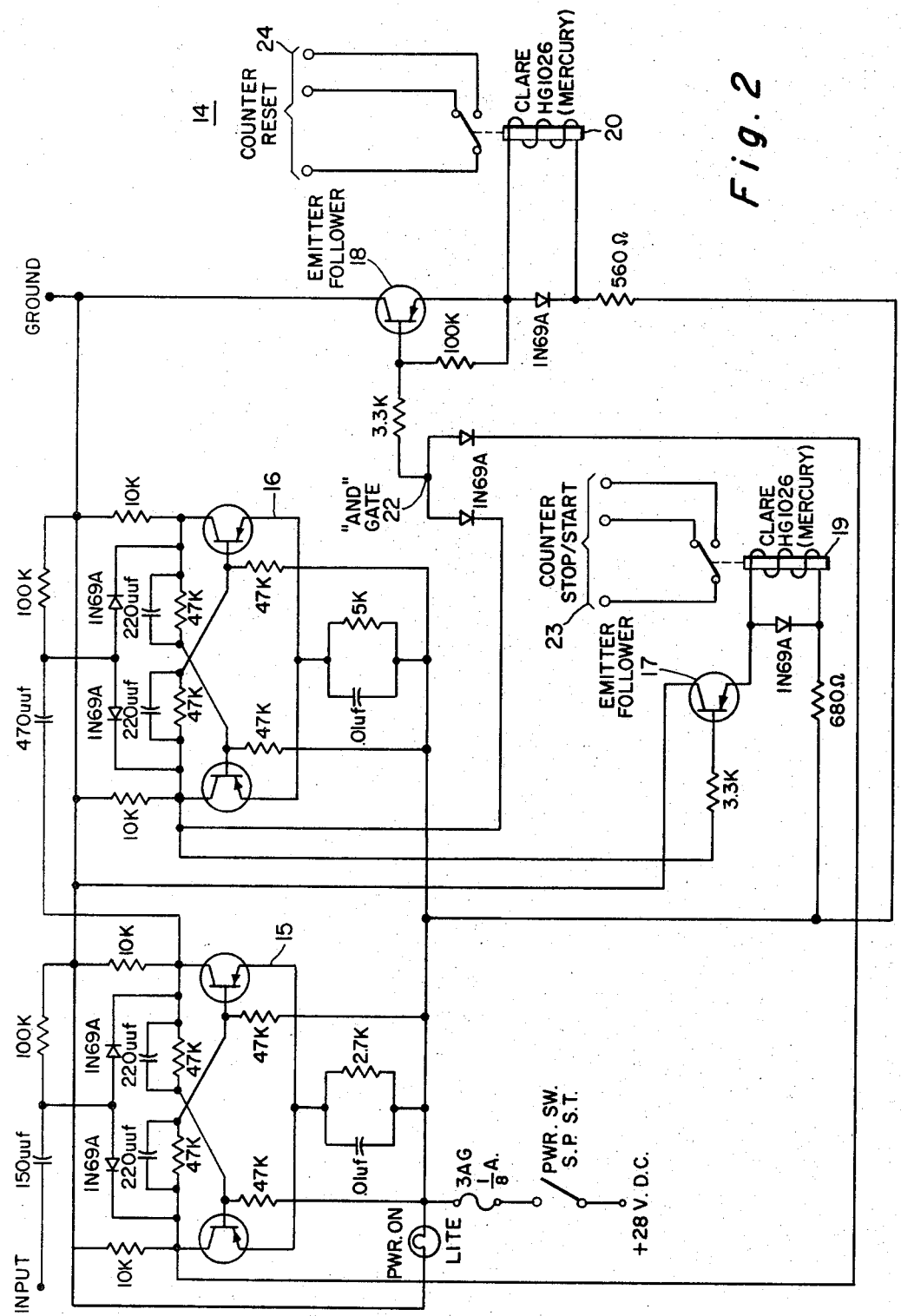

United States Patent Office 3,416,362
Patented Dec. 17, 1968

3,416,362
SYSTEM FOR MEASURING MOMENTS OF INERTIA
Leroy C. McGahan, Camarillo, Calif., assignor to the United States of America as represented by the Secretary of the Navy
Filed Sept. 22, 1966, Ser. No. 581,397
5 Claims. (Cl. 73—65)

ABSTRACT OF THE DISCLOSURE

A method and apparatus to measure moments of inertia of a wide variety of objects, particularly missiles, wherein the object to be measured is set in oscillation in a magnetic field, and the dampening of the magnetic field by the oscillating object is sensed and converted electrically into a pulsed voltage signal, whose number of pulse counts is used to calculate the moment of inertia.

---

Figure 1:
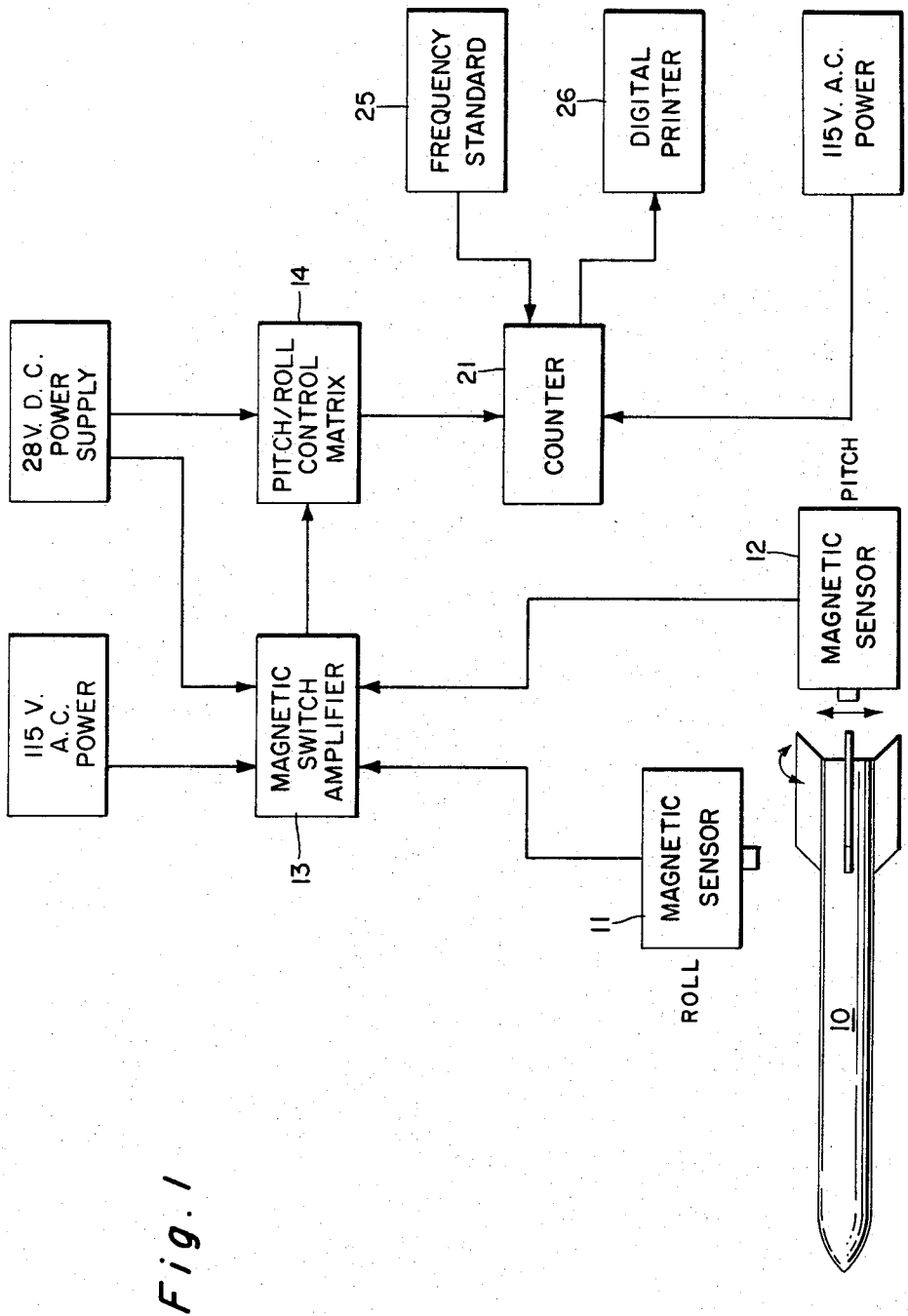

The invention described herein may be manufactured and used by or for the Government of the United States of America for governmental purposes without the payment of any royalties thereon or therefor.

This invention relates to an improved system for measuring moments of inertia of a wide variety of objects or articles of various types and shapes, and particularly missiles.

Prior art systems, such as that described in U.S. Patent No. 3,106,091 issued Oc. 8, 1963 to A. L. Korr, involve the use of a light source, photoelectric cell, photoelectric cell amplifier, mirror and power sources for a B+ filament, recorder amplifier and recorder, respectively. In such prior at systems, considerable time is consumed in properly orientating the mirror with the light source and the photoelectric cell. The weight of the mirror introduces error in making measurements upon light weight objects or articles. The close association of high voltages, such as a B+ voltage to the photoelectric cell, and the introduction of heat, such as that from the light source, are undesirable in an explosive atmosphere, such as that presented by a live missile, upon which moments of inertia measurements are being made. Furthermore, the data finally obtained in the use of such prior art systems is recorded on a large amount of recording paper, which is necessary to be certain that the missile, or other object, has stabilized, as indicated by a repeatable oscillation rate, during the measurement. The resulting data necessarily is laboriously reduced by hand, analyzed and interpreted. Thus an element of human error is involved in the data reduction process and a long time delay is encountered before readout finally is obtained.

Accordingly, it is an object of this invention to provide an improved system for making measurements of moments of inertia.

Another object is to provide a safe, speedy, accurate and convenient system for making measurements of moments of inertia.

A further object of this invention is to provide a system for making measurements of moments of inertia of missiles which is characterized by greater safety, accuracy, speed, convenience and efficiency than in the case of prior art systems.

Additional objects of the invention will become apparent from the following description, which is given primarily for purposes of illustration, and not limitation.

Stated in general terms, the objects of the invention are attained by providing a system for measuring moments of inertia which includes the use of a magnetic sensor in association with an oscillating object or article, such as a missile oscillating about its axis in either the pitch or roll position. The dampening effects produced in the magnetic field of the magnetic sensor by an oscillating missile, for example, are amplified and the varying signal of the sensor is converted to a pulsed output by a magnetic switch amplifier coupled with the magnetic sensor. The pulsed output of the switch amplifier is fed to a control matrix which is capable of displaying the desired count periods on a visual indicator and drives a period counter and a digital printer. A frequency standard is coupled with the counter for the purpose of shifting the digits in the numerical display to provide the maximum resolution in the displayed numerical periods. When the displayed number, or time interval, has stabilized, it is employed to calculate the moment of inertia of the object being measured.

A more detailed description of a specific embodiment of the invention is given below with reference to the accompanying drawings, wherein:

FIG. 1 is a schematic block diagram showing the system of the invention applied to the measurement of moments of inertia of missiles; and FIG. 2 is a schematic circuit diagram showing the circuitry of a pitch/roll rate control matrix employed in the system of FIG. 1.

Before determining the moment of inertia of a missile, the moment of inertia of suspension apparatus (torsion bar, or cable suspension system), is determined.

The missile 10 then is suspended at its center of gravity in the pitch and in the roll position, respectively, on a torsion system, such as a pendulum of the type shown and described in U.S. Patent No. 3,106,091 to which reference was made hereinabove. As a torsion pendulum does not form a novel part of the instant invention, and any suitable prior art torsion pendulum can be used, no further description of such apparatus is given. Only the magnetic sensors 11 and 12 and live missile 10, together with the torsion pendulum (not shown) are located in the potentially explosive, or inflammable, atmosphere or environment and the remainder of the system, including the operator, are located in an adjacent building. They are separated by a concrete, protective wall from the area where the missiles are located. Magnetic sensors 11 and 12 are sealed in steel containers which are explosion-proof.

Generally speaking, the suspended missile 10 is set into oscillation in the pitch position and in the roll position, respectively, so that its oscillation rate (moment of inertia) can be determined in each position. After a short period of time, the oscillation rate of missile 10 becomes stable, that is, repeatable in time, to establish a time constant. From this time constant, the moment of inertia of the suspension apparatus is subtracted. The resulting numerical value is then introduced into a formula and the moment of inertia of missile 10 is calculated.

The magnetic sensors 11 and 12 are used to sense the disturbance of the magnetic fields thereof by the oscillation of the metallic missile 10 in close proximity to the sensors, thus causing a dampening of the respective magnetic fields in the roll position and in the pitch position of the missile, respectively. The resulting, sensed dampening effect of the magnetic fields is amplified by magnetic switch (sensor) amplifier 13, which also converts the varying magnetic signal to a pulsed voltage output. The resulting pulsed voltage output of amplifier 13 is fed into the pitch/roll rate control matrix 14.

The pitch/roll rate control matrix 14, as shown in FIG. 2, consists of an all solid state circuit containing two flip-flops 15 and 16, two emitter followers, 17 and 18 and two mercury relays 19 and 20. Flip-flop divides the input pulse from amplifier 13 by two and flip-flop 16 divides the output of flip-flop 15 by two. This arrangement permits one to see one voltage pulse per oscillation by way of flip-flop 15 and the necessary pulse code to control electronic counter 21 by way of flip-flops 15 and 16 and an AND gate circuit 22.

The collector terminal output of flip-flop 16 provides a counter stop/start function at 23 and the sum of the output of flip-flops 15 and 16 provides the counter reset function at 24 by way of AND gate 22. The two output transistors, or emitter followers, 17 and 18 provide isolation for the networks of flip-flops 15 and 16 and the necessary low impedance output to mercury relays 19 and 20. Relays 19 and 20 serve the purpose of making provision for operation of the various types of counters that may be controlled by a different electrical signal, that is, ground, minus voltage or plus voltage.

The frequency standard 25 serves the purpose of bypassing the internal sync frequency of counter 21 to provide an external sync frequency. This feature permits the shifting of digits in the readout of counter 21 over any range of frequencies to five place accuracy. The pitch/roll count periods are displayed automatically and repeatedly to five digits accuracy on counter 21 when missile 10 is oscillating about the roll axis and about the pitch axis, respectviely. When the numbers visually displayed on counter 21 become repetitious, the oscillation of missile 10 has become stabilized. The resulting, stabilized number, or time interval, then is used to calculate the moment of inertia of missile 10. It is also recorded by the digital printer 26 as a permanent record.

The system for measuring moments of inertia of the present invention is explosion-proof and provides a maximum of safety to personnel, test structures and equipment. It is very easily set up for testing work and is fool-proof for determining pitch and roll rates of missiles and other articles. Stable oscillation of the article under test is instantly determined with a direct, very accurate readout as contrasted with prior art systems necessitating recording of output pulses for long periods of time and averaging the periods from about five separate test runs. In such prior art systems, wherein there was no indication as to stability of the missile oscillations, large amounts of photo-process recorder paper were used because about a hundred pulses were required for each test run to obtain an average value.

In the specific embodiment of the invention described hereinabove, with reference to FIGS. 1 and 2, the magnetic sensors 11 and 12 were magnetic switch (sensors) Model 11FB42-50, in each case, manufactured by Honeywell; magnetic switch amplifier 13 was a modified microswitch Model 42FC1 manufactured by Honeywell; counter 21 was a Hewlett-Packard Model 521 instrument; frequency standard 25 was a Hewlett-Packard Model 100ER device and digital printer 26 was Model 560A manufactured by Hewlett-Packard. All of the transistors shown in the pitch/roll control matrix 14, of FIG. 2, were 2N1008B.

Obviously many modifications and variations of the present invention are possible in the light of the above teachings. It is therefore to be understood that within the scope of the appended claims the invention may be practiced otherwise than as specifically described.

I claim:

1. A system for measuring the moment of inertia of an object containing magnetic material which comprises:
magnetic sensor means having a magnetic field; torsion apparatus for supporting the object for torsional oscillation within the magnetic field, so that the object dampens the magnetic field in an oscillating manner corresponding with the oscillation of the object;
magnetic switch amplifier means coupled with the magnetic sensor means for amplifying the oscillatory dampening effects produced in the magnetic field of the magnetic sensor means and for converting the varying signal of the magnetic sensor means into a pulsed voltage output; and
control matrix means coupled with the magnetic switch amplifier means for receiving the pulsed output of the magnetic switch amplifier means and adapted for displaying the desired count periods of oscillation on a visual indicator means.

2. A system according to claim 1, wherein:
period counter means is coupled with the control matrix means of producing numerical display of digits; and
frequency standard means is coupled with the period coutner means for shifting the digits in the numerical display to provide the maximum resolution in the displayed numerical periods.

3. A system according to claim 2, wherein:
digital printer means is coupled with the period counter means for recording the numerical display of digits of the period counter means.

4. A system according to claim 1, wherein said control matrix means includes:
first flip-flop circuit means for dividing the output pulse from the magnetic switch amplifier means by two; and
second flip-flop circuit means coupled with the first flip-flop circuit means for dividing the output of the first flip-flop circuit means by two;
the output of said second flip-flop circuit means providing a stop/start function; and
the sum of the output of said first and second flip-flop circuit means providing a counter reset function by way of AND gate means.

5. A method for measuring the moment of inerita of an object which comprises the steps of:
setting the object in oscillation on a torsion support means in the zone of a magnetic field;
sensing the dampening of the magnetic field by the oscillating object;
converting the sensed dampening effect signal into a pulsed voltage signal; and
determining the count periods of the oscillation of the object for calculation of the moment of inertia thereof.

References Cited

UNITED STATES PATENTS

| | | | |
|---|---|---|---|
| 3,040,563 | 6/1962 | Eckles et al. | 73—65 |
| 3,064,469 | 11/1962 | Price | 73—65 |
| 3,106,091 | 10/1963 | Korr | 73—65 |
| 3,221,543 | 12/1965 | Hall et al. | 73—65 |

OTHER REFERENCES

Boucher et al.: April 1954, NACA TN 3084, National Advisory Committee for Aeronautics "A Method for Measuring the Product of Inertia and the Principle Longitudinal Axis of Inertia of an Airplane."

JAMES J. GILL, *Primary Examiner.*

R. S. SALZMAN, *Assistant Examiner.*